March 14, 1972    C. W. MORTENSON    3,649,434
ENCAPSULATING PROCESS AND PRODUCT OF WIRE COATED
WITH POLY(TETRAFLUORETHYLENE)
Original Filed Sept. 17, 1965      2 Sheets-Sheet 1
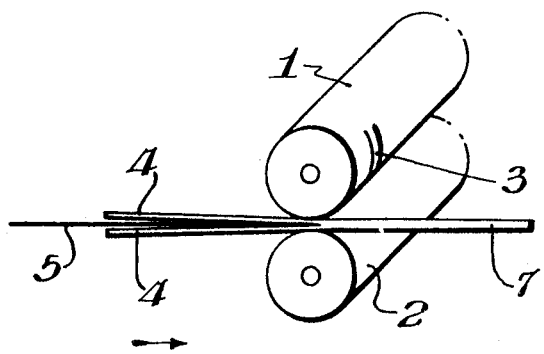
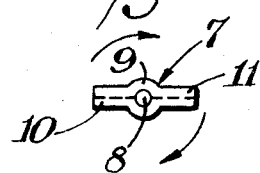
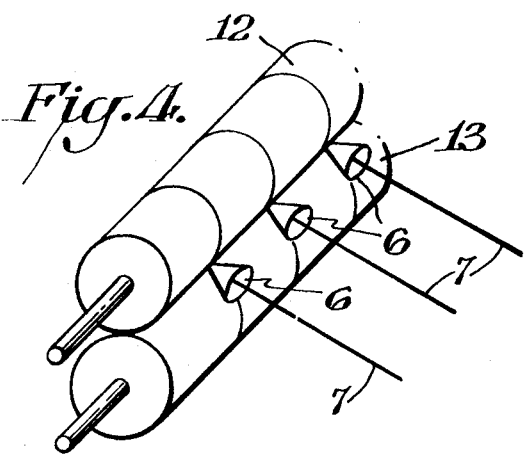
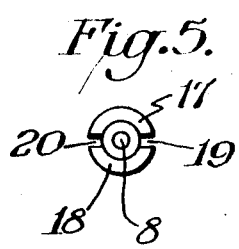
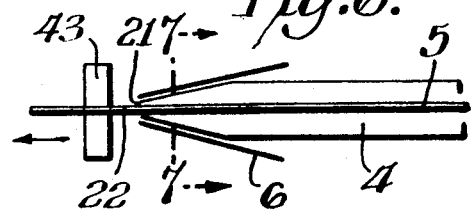
INVENTOR
Carl Walter Mortenson

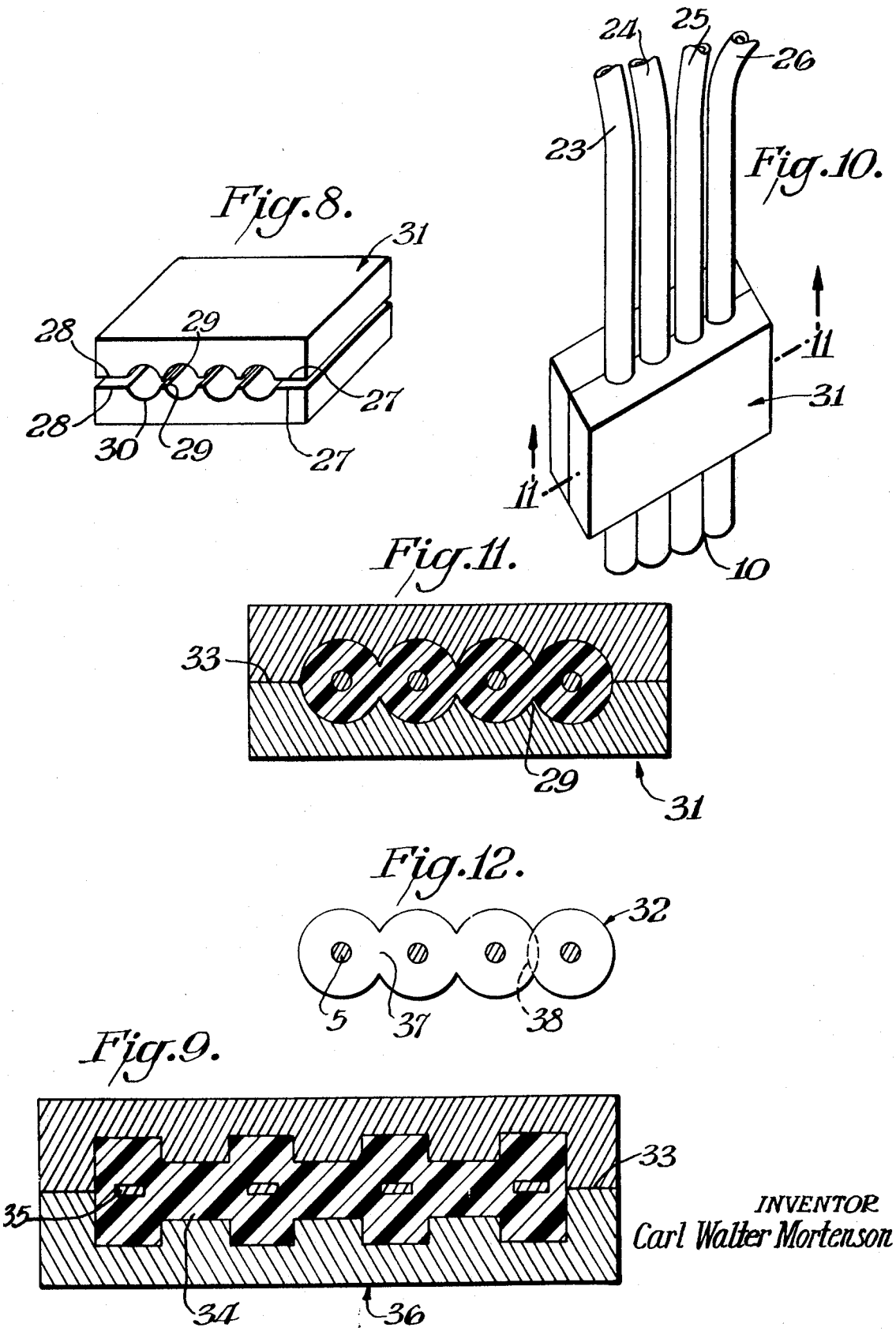

United States Patent Office 3,649,434
Patented Mar. 14, 1972

3,649,434
ENCAPSULATING PROCESS AND PRODUCTS OF WIRE COATED WITH POLY(TETRAFLUORO-ETHYLENE)
Carl Walter Mortenson, R.D. 3, Newark, Del. 19711
Continuation of application Ser. No. 490,165, Sept. 17, 1965, which is a continuation-in-part of application Ser. No. 414,604, Nov. 30, 1964. This application Sept. 2, 1969, Ser. No. 854,595
Int. Cl. B44d 1/42
U.S. Cl. 161—143                    13 Claims

ABSTRACT OF THE DISCLOSURE

Unsintered poly(tetrafluoroethylene) in sheet form is passed through a funnel-like element to cause the sheet to roll along its longitudinal axis and to surround an article, such as a wire, that is being simultaneously passed through the aperture formed by the rolling sheet material, thus wrapping the article which is then subjected to pressure to bond the unsintered sheets together where they contact each other. The coated article that emerges is then heated to sinter the poly(tetrafluoroethylene).

---

This invention relates to an improved process for coating wire with a polymeric material and more particularly to the production of insulated electrical conductors wherein the polymeric insulation around the conductor is applied from a film or sheet of the polymer.

This case is a continuation of Ser. No. 490,165, filed on Sept. 17, 1965, now abandoned and which was a continuation-in-part of application Ser. No. 414,604 filed on Nov. 30, 1964, now abandoned.

In the production of insulated electrical conductors, a number of processes have been employed including (1) the coating of the conductor with a plastic material by extrusion of molten plastic through a die, (2) dipping the conductor in a solution or dispersion of the plastic material followed by wiping away excess coating material and (3) spirally wrapping the conductor with tape insulation which may be in the form of a fabric tape impregnated with a plastic material having insulation properties. Many of these processes are cumbersome in their operation and the results obtained leave much to be desired. For example, non-uniformity of coating and pin-holes are often encountered. Furthermore, they are not well adapted for the application of poly(tetrafluoroethylene), a very high heat resistant polymer, which is difficult to process by conventional means.

More recently an improved process for coating electric conductors with poly(tetrafluoroethylene) has been developed as described in U.S. Pat. 3,082,292. The patented process involves the coating of wires with the polymeric material in sheet form by passing an assembly of a plurality of wires between two sheets of unsintered poly(tetrafluoroethylene) between two rolls. Where the unsintered sheets are pressed together a strong bond is formed. Sintering of the polymer after encapsulating the wire may be accomplished by passing the composite through a suitably heated oven. This process provides wires individually surrounded by a polymeric material but bound together with a web of the poly(tetrafluoroethylene). The product is highly useful in this form. If desired, the individual coated wires may be separated from the composite structure by cutting through the web connecting them. By this means, however, small portions of the web remain and these create problems in the use of the coated wires in the winding of electrical coils and in general insulation in the manufacture of electrical equipment. The patent suggests that a single wire may be coated without its being joined to other wires but in following the patented process for single wire coating the product would have a web.

This invention has as an object the provision of a process for the coating of wires and the like with a fluorocarbon polymer which process affords greater uniformity of coating and elimination of pin-holing in the coating. Another purpose is the provision of a process for encapsulating a wire with polymeric fluorocarbons in sheet form without overlapping spirals and without webs. Another aim is the provision of a process for coating a wire with poly(tetrafluoroethylene) in sheet form whereby the wire is encapsulated uniformly without the formation of any web and with the production of an improved insulated conductor. These and other purposes appear hereinafter.

The objectives of this invention are accomplished preferably by a one-step process involving passing a wire or wire-like electrical conductor, disposed between two continuous sheets of tapes of a polymeric fluorocarbon, through a tapered orifice or die or funnel-like element in which both the desired wrapping and bonding is effected or through such an element to effect wrapping only, the exit orifice of the element then being adjacent to a receiving pressure element such as the nip of two pressure rolls having matching grooves in their surfaces where pressure is exerted on all the wire/polymeric sheet assembly. In another process of this invention a conductor is produced in accordance with U.S. 3,082,292, and the resultant assembly with its web(s) is passed through the funnel. In the passing, the funnel causes the webs that extend transversely away from the conductor to fold over and around the conductor. Since there normally is a web on opposite sides and since each is curved around in the same direction, the conductor becomes covered with a uniform thickness of the film. The polymeric material is bonded together in the usual fashion by the pressure rolls.

The invention will be further understood by reference to the description below and to the drawings all of which are given for illustrative purposes only and the drawings being as follows:

FIG. 1 is a perspective of the assembly showing a wire positioned between two sheets of unsintered poly(tetrafluoroethylene) passing through the nip of pressure rolls each of which is grooved about its entire circumference and showing the assembly emerging as a unitary structure with the polymer surrounding the wire;

FIG. 2 is a cross-section of the assembly as it comes from the apparatus of FIG. 1 showing the two webs extending away from the wire;

FIG. 3 is an end view of the assembly that emerges from the apparatus of FIG. 1 passing through the tapered element used in this invention, and it is also the end view of the product made in the one-step process of this invention;

FIG. 4 is a perspective view of the assembly used in one-step processing and in the two step and illustrating the adaptation of the process for encapsulating a plurality of wires individually but simultaneously;

FIG. 5 is a cross-sectional end view of another embodiment of this invention in which the width of the polymeric sheet material is selected so as to be slightly less than that needed to completely surround the wire leaving a small gap after passage through the rolls. The gap is subsequently closed to give complete encapsulation by further pressing or rolling or by passing the assembly through a suitably heated oven to sinter or fuse the polymeric material. This procedure avoids any overlap of the polymeric material and any formation of a bulge at that point;

FIG. 6 illustrates a still further embodiment of this invention in which the wire is passed through a stationary sizing die;

FIG. 7, taken on lines 7—7 of FIG. 6, shows wire being wrapped in the spiral member prior to its leaving this member to be passed to the die;

FIG. 8 is a perspective view of a die that may be used in the preparation of the multi-conductors of this invention. It is shown in two halves that are not quite in the closed position;

FIG. 9 is a cross-section of another die which can be used, this being shown in closed position with conductor and coating therein;

FIG. 10 is a perspective showing four assemblies such as shown in FIG. 3 converging in the pressure die and being passed simultaneously through it to weld each of the four to adjacent members;

FIG. 11, taken on line 11—11 of FIG. 10, is a cross-section showing the contour of the grooves of a die of this invention with four conductors and coating material being positioned therein for processing; and FIG. 12 is an end view of multi-conductor of this invention.

As shown in FIG. 1, wire 5, traveling in the direction of the arrow, is positioned between two sheets or tapes 4 moving along with it toward the pressure rolls 1 and 2. These rolls are preferably both grooved having grooves 3, and the rolls and this step are comparable to the rolls and the procedure given in U.S. 3,082,292. The sheets or tapes 4 are unsintered poly(tetrafluoroethylene) and all the various fluorocarbon polymers and the various techniques and conditions disclosed in U.S. 3,082,292 may be applied in this step.

The assembly 7 that comes from this first step has the structure shown in FIG. 2. The conductor 8 is surrounded by one thickness 9 of the polymeric material or tape 4 and it has two webs 10 and 11 extending along its length and transversely away from it. The webs 10 and 11 are made up of the two tapes that have been tightly bonded together as they were pressed together as they went through the nip of rollers 1 and 2, the dotted line in FIG. 2 being merely a visual aid.

In the next step rollers like 1 and 2 are equipped with a tapered member 6 (see FIG. 4) positioned just in front and very close to the entrance to the nip of the rollers. For convenience a plurality of assemblies are shown being processed in FIG. 4.

In FIG. 4 oppositely disposed cylindrical rolls 12 and 13 are positioned to a small and specified separation from each other, as previously shown. The tapered die or orifice 6 opens at the nip of the rolls at the grooved portion of the roll. The encapsulated wire is shown as assembly 7 with the wire embedded therein and the webs 10 and 11 positioned as described. As the assembly 7 passes through element 6 web 10 is curved over clockwise around conductor 8. Web 11 is similarly directed, as shown by the arrows in FIG. 2. Both may be moved counter-clockwise if desired, and this can be done in the string-up. As assembly 7 passes through the element 6 the conductor becomes wrapped without any overlap by a second layer of the polymer the thickness of which depends upon the thickness of the webs 10 and 11. The assembly emerges directly to the roller nip where the unsintered polymer in the webs is bonded tightly to polymer already surrounding the conductor 8. The article is shown in cross-section in FIG. 3. There the conductor 8 is now coated with a thickness 14 of the poly(tetrafluoroethylene) which is about 3 times the original thickness of the tape. The circular, dotted line in FIG. 3 is shown merely to illustrate this, the polymer being actually uniformly welded throughout with no bonding line. The conductor is then sent to a sintering oven (not shown) for sintering.

The exit end of element 6 is so close to the nip of rollers 12 and 13 that the webs have no opportunity to fly up or down or flap, and the dimensions of the grooves 3 in these rollers are such that the homogeneous weld required for the bonding effected by the process of U.S. 3,082,292 is again produced. It is surprising that material previously pressed together to form the bonding of U.S. 3,082,292 can again be pressed to produce the weld and a thicker product. A distinct advantage lies in this, for if any of the initial coating 9 in assembly 7 has a pin hole in it, the second coating melding with it will with almost certainty either fill it or adequately block it. Thus, a highly improved wire results.

In FIG. 5 is a modification where the sheet or tape material in webs 17 and 18 has not been joined, due to preselection of widths of this material to prevent overlapping. Complete encapsulation of the wire with subsequent fusing or sintering at suitable temperatures is effected, the gaps 19 and 20 being filled by expansion of the material in the compression step or by successive passages through sizing dies progressively smaller in orifice diameter or by sintering or combination of these steps. Such procedures may be employed to eliminate any undesirable formation of bulges at the overlap which might result if greater widths are used.

In a preferred embodiment of this invention, the wire 5, positioned between two parallel oppositely disposed sheets or tapes of material 4, is guided continuously into a tapered die 6 and then directly from the orifice of die 6 into the nip of pressure rolls 12 and 13 through grooved area, the passing being without the formation of assembly 7. That is, an article like that shown in FIG. 3 is produced in one step. It has only one polymer thickness except for any longitudinal running overlap where the coating is almost twice the sheet's thickness. The assembly as it emerges comprises complete encapsulation of the wire, unless the variation shown in FIG. 5 is desired, and it is sent directly to the sintering oven. While some heat and some sintering may be effected at the pressure step, it is generally desirable in order to obtain maximum electrical and mechanical properties to use cold rolls and subsequently sinter the coating by exposure to suitable temperatures by passing the assembly through a heated oven. FIG. 4 can be used to illustrate this one-step process, for the assembly 7 is merely replaced by wire 5 and a tape or tapes 4 as shown in FIG. 1.

Another preferred embodiment comprises passing the wire 5 and tape 4, as shown in FIG. 6, to and through the spiral member or funnel 6 to effect a parallel wrap. That is, one tape wraps one half of the wire and the other wraps the other half as the wire and tapes are pulled through the orifice 21 of spiral member 6. If desired, the widths of the tapes may differ, and an overlap is provided. Also, only one tape of sufficient width may be used to wrap the wire with a single or with a plurality of tape thicknesses of polymer. The wraps produced are not the conventional spiral wraps with overlaps running helically along the length of the wire, but are parallel wraps with or without longitudinally, straight running overlaps. An additional advantage that attends the use of the tapering spiral embodiment is that the tape 4 can be very quickly and easily made to string up through the assembly simply by inserting it into one of the openings in the spiral and into running contact with the moving wire, for the tape runs with the wire through the smaller exit end of the spiral and swirls around through the spiralled openings to come out at the larger inlet end of the spiral and then to run in a parallel fashion with the wire thereafter, the string-up being automatic and very rapid.

Whatever wrap is used, the assembly 22 emerging from the funnel 6 is passed through the die 43 which has an orifice through it smaller in diameter than the outside diameter of assembly 22. The channel in die 43 may have the same diameter throughout its length or the channel may be tapered with the larger end usually being the orifice receiving assembly 22. Die 43 may be made up of hingedly connected halves to provide for easy string-up. In any event pressure is exerted on the polymeric material in assembly 22 so that the polymer is pressed together to form a uniform, homogeneous weld. The assembly is then heated in the usual fashion to sinter the fluorocarbon.

The process of this invention and the articles made thereby will be further understood by reference to the following examples which are not limitative but are given for illustrative purposes only.

Example I

A No. 22 gauge stranded wire is positioned between two tapes of unsintered poly(tetrafluoroethylene) 0.008 inch thick and 0.22 inch wide and the assembly is guided into a tapered die or funnel and then directly from the die orifice into the nip of two opposing unheated rolls, six inches in diameter, at a point in the rolls' surfaces where the surface of each of the rolls carried a groove contoured to form a circular cross section about 0.045 inch in diameter at the plane of closest approach of the rolls. The rolls are adjusted so that the ungrooved surfaces were 0.003 inch apart at the bit. The rolls are revolved so that the tape surrounded the wire without web extensions by passing the conductor and the tapes coming from the tapered die directly to the roll groove so that all of the poly(tetrafluoroethylene) lies within the grooves. The composite is placed under pressure as it passes through the grooves, the pressure being sufficient to form a homogeneous coating around the wire core. This shows no tendency to separate during later handling of the unsintered assembly. The assembly is placed in an oven at 350° C. for five minutes and then removed and cooled. The heating step may be carried out on a continuous basis if desired. The final product is tightly held together and can be flexed and twisted repeatedly without harming it. The coating thickness around the wire is about eighteen mils. No electrical flaws are found upon immersing the coated wire in salt water with 3000 volts potential between the wire and the salt water. The diameter of the wire being about 0.030 inch, the diameter of the conductor is about 0.060 inch. Depending upon the settings for pressure the overall diameter may run as high as 0.075 inch. Coatings of about 5 to about 50 mils are readily produced.

Example II

In this example the procedure of Example I is followed except that a plurality or series of wires is coated with poly(tetrafluoroethylene) tape simultaneously as illustrated in FIG. 4. Similar satisfactory mechanical and electrical results are obtained in each of the wires.

Example III

A strand of wire containing seven conductors each of which is 0.010 inch in diameter and having an overall diameter of about 0.030 inch is passed through grooved rollers 1 and 2 shown in FIG. 1 along with tapes 4 of poly(tetrafluoroethylene). The assembly that results has a configuration shown in FIG. 2. In order to effect the removal of the webs 10 and 11 and the conversion of these webs into insulation for the conductor the assembly 7 is passed through a tapered die 6 and immediately into the grooves of similar rollers 12 and 13. The string-up is such that webs 10 and 11 are rotated as shown in FIG. 2 and is such that all of the insulating material is contained within the grooves of rollers 12 and 13. The insulated cable that emerges has a cross-section shown in FIG. 3. When two sheets of tape which are each of 0.010 inch thickness are used, the final product has an over-all outside diameter of about 0.085 inch. Actually, the over-all dimension will be less than this depending upon the amount of pressure that is placed on the assembly, and the assembly produced by the above procedure will generally have an over-all diameter of about 0.075 inch.

A number of assemblies 7 can be produced simultaneously using long rollers, and the ribbon cables which result may be passed through a slitter to produce a plurality of assemblies 7. Each of these can be simultaneously processed by passing them through the apparatus shown in FIG. 4 which provides a tubular die and a set of receiving, rotating grooves for each assembly.

Again, the apparatus shown in FIG. 6 can be used for receiving an assembly 7, the stationary sizing die 43 along with the tapered die 6 effecting the conversion of the webs to insulation. The sizing die, as discussed elsewhere, in one modification has a tapered bore through it which affords the wrap-around of the webs at the larger receiving end and as the assembly passes through the die, and it affords the pressure squeeze at the smaller exit end which has a pressure section by virute of its smaller diameter. In practice the emerging conductor expands very, very slightly upon its being released from the pressure area, but this exansion is off-set during the subsequent sintering step.

Example IV

To prepare ribbon cables mentioned above, conductors, like those shown in FIG. 3, covered with poly(tetrafluoroethylene) by the process of this invention may be coupled prior to sintering with others of its kind to produce a multiconductor wiring strip in which there are no webs such as the ribbon cable shown in FIG. 12. For example, a plurality of the insulated conductors 23, 24, 25 and 26 may be passed simultaneously through a grooved die 31 such as that shown in FIG. 8. The die in FIG. 8 is in an open position, and it will be appreciated that in use with the die closed surfaces 27 meet as do surfaces 28 but that ridges 29 do not meet and that the grooves running through the length of the die may be tapered narrowing from the inlet end to the exit to effect the pressure or compression desired. Such tapered grooves 30 in the die are spaced so that the separate elements 23, 24, 25 and 26 are made to contact and to press, in comparable areas, longitudinally against each other during the passage without forming webs. To effect this, each of the grooves 30 and die 31 is contiguous with its adjacent groove or grooves in an overlapping manner. They are not separate or isolated grooves, but since ridges 29 do not meet, there is a passage-way running along the lengths of the groove that permits the polymeric material on one covered conductor to tend to overflow into or ride in the adjacent portion of the adjacent groove. If there were nothing in the adjacent grooves, the polymeric material in the overlap area would ride partly in the adjacent groove since the diameter of the groove is less than the diameter of the conductor. However, since there is a solid material in the adjacent groove, the solid materials in contact are pressed together as the elements are drawn through the die, the grooves having sections the inside diameter of which are slightly less than the corresponding outside diameters of the subject assembly passing through the given grooves. Expressing the matter in another way one could point to each conductor as a perfect cylinder prior to the welding but after the welding an arc of each has been pushed into the adjacent cylinder at the joining so that the line of joining is not a part of a true circle for either of the given, adjacent cylinders. This overlapping is shown by dotted lines 38 in FIG. 12.

The unsintered poly(tetrafluoroethylene) in the one element is made to blend into unsintered poly(tetrafluoroethylene) in the other element with which it comes into contact. Since each of the adjacent elements is pushed up against the other and since the unsintered poly(tetrafluoroethylene) is pressed together to form a homogeneous mass at the points of contact, the entire unit holds together even though the polymer is unsintered and even though there is applied a second pressing, the first being in the formation of the given conductor. Thus, the unsintered strip or ribbon can be wound up, handled and shipped or it may be passed directly from the die to a source of heat where the polymer is sintered. The resultant multiconductor 32 has a cross-section such as that in FIG. 12, an end view. This assembly is one in which there are no connecting webs between adjacent conductors such as are present in the products of U.S. Pat. 3,082,292.

In order to assist in effecting the welding or the pressing of adjacent assemblies it is preferred that the ends of the dies having matching faces 33 shown in FIGS. 9 and 11 that contact each other and thereby confine the plurality of the assemblies to the grooved volume. Each outermost conductor of cable 32 retains its original contour at the sides farthest from the conductor to which it is attached—that is, there are no webs at the sides of the cables. The extensions, rib or ridge 29 in the die, preserve the majority of the rounded contours, but do not, of course, contact co-acting, adjacent extensions in order to provide access for the polymeric materials to make contact to form the welds. Also, it is to be appreciated that each of the grooves 30 may be tapered being larger at the entrance end of die 31 than at their exit ends and that the stationary die may be replaced by grooved rolls. Further, instead of using grooved rolls the die itself may be rotated. The grooves can, if desired, be of different size and shape, and conductors of different colors may be processed to produce color-coded assemblies. In FIG. 9, a die 36 is shown in which the contour is rectangular and a web 34 is produced joining each conductor 35 which is shown as a flat conductor. Thus, one may produce multi-conductors connected by webs by the process of this invention if he wishes. The ribbon cables may be flat or round or mixtures of flat and round conductors or of any shape desired.

Example V

A flat conductor 35 being 0.004 inch in thickness and 0.130 inch wide is covered with unsintered poly(tetrafluoroethylene) by passing it between two thicknesses of the polymer in tape form, each being 0.010 inch thick. The width of the tape is about 0.28 inch. In this instance the assembly is processed as described above to produce an element such as that shown in FIG. 2 except that the conductor and the coating are flat. The polymer coating is 0.150 inch in width, extending at each end about 0.010 inch beyond the end of the conductor 35. A web 34 is formed which is about 0.008 inch thick and about 0.060 inch wide. A plurality of these are then passed side-by-side through pressure die 36 which is contoured to eliminate the web outermost on each conductor that is to be an outermost conductor in the cable and to press adjacent webs of previously welded unsintered poly(tetrafluoroethylene) together forming a new weld and binding each conductor to its adjacent conductor. The longitudinally running compacting results in a greater mass of insulation in the shortest straight line distances between adjacent conductors, just where it is needed.

In a second variation the flat conductor 35 is used to produce an element like assembly 32 shown in FIG. 12, the conductor being flat but the insulation being round and there being no webs in between the conductors nor at the sides of the ribbon cable. This may be used as such or, if desired, it may be passed through die 36 to produce the highly compacted webs 34 and a structure such as that shown in cross-hatching in die 36 in FIG. 9. In other words, webs 34 may be produced by compacting previously existing webs or by further compacting the areas 38 in cables 32 shown in FIG. 12.

In the rounded assemblies produced such as 32 shown in FIG. 12, it is to be appreciated that the conductor 5 is surrounded by a thickness of polymer of approximately the same thickness and shape that it had prior to the converging and welding, but that at the area 37 of joinder there is no line indicating a joint and that the covering circular initially is not so after the welding due to the squeezing effected by the pressing. The dimension reduction will always be present in welded circular multi-conductors of this invention. In cables of the type shown in FIG. 12 there is no web or thin strip joining such conductors because right at the places of joining the polymeric material has been pushed together to form the weld. Cables of the type shown in FIG. 9 do have webs these being different from the webs shown in U.S. 3,082,292 in that they are doubly pressed and much more compacted and contain more polymeric material in them than do the webs of the prior art. The inceased amount of insulating material between adjacent conductors advantageously reduces the electrical effects that occur between electrical conductors lying close together. Cables such as those shown in FIG. 12 are preferred because the webs have been eliminated and the overall width of the cable has been substantially reduced.

From the above it can be seen that the processes of this invention include pressing again unsintered tetrafluoroethylene polymer which has been previously pressed to form welds to produce cables. These multi-conductors contain a plurality of articles which are separated by a compacted polymeric mass which has more polymer in the compacted area than is present in the coating thicknesses that are present around the article in the non-bonding areas.

The products produced in the examples are sintered in the usual fashion and possess outstanding corona resistance having virtually no pin holes.

Although the drawings and examples described above relate to the process using a pressure rolls system where both of the rolls are grooved, in some instances it may be desirable to groove only one roll so that the coated conductor has a flat surface allowing it to lie flat or to be positioned more stably on flat surfaces.

Although the use of tapered dies in the feed system together with the normally grooved rolls as described above is preferred, it is also possible in some cases to eliminate the tapered die feeders and pass the wire/polymeric tape assembly directly into grooves in the pressure rolls or through a stationary sizing die.

Another variation involves the imparting of a twisting or rotary motion to the wire/polymeric tape assembly prior to its entry into the die zone to assist in causing the flat tapes to curl around and surround the wire core before the assembly enters the groove(s) of the rolls. In still another variation, the assembly 7 is passed into pressure rolls positioned behind but slightly to the right or left of the first set of rolls to get assistance in the curving over of the webs.

The process of this invention provides a versatile means to encapsulate electrical components or any component that requires protection from a corrosive or harmful environment by encapsulating it in an impervious envelope(s) of poly(tetrafluoroethylene). These include wires, plates, sheets, ribbons and the like of conductive materials, and the principles of this invention may be applied in the making of bases for printed circuits.

A variety of articles may be processed in accordance with this invention including wires, rods, strips, straps and similar items. It is preferred to process axially symmetrical objects for the attendant ease with which the rolls may be grooved. The shapes or contours of the grooves may be slots, circular, rectangular, square, hexagonal, diamond or other shapes and may vary in size considerably.

It is surprising that the intractable poly(tetrafluoroethylene) resin can be pressed together by the second pressing to form the tightly bound assemblies of this invention. Extrusion processes for intractable poly(tetrafluoroethylene) resin are not known in which processes would produce coatings free from electrical flaws. For example, products coated using powdered polymer or using tape in the conventional spiral, overlapping wrapping show electrical failures in the insulation under high electrical stresses. Furthermore, it has not been feasible to extrude coatings thinner than about 0.008 inch. Thin coatings of good electrical quality can be applied to electrical conductors by wrapping then with poly(tetrafluoroethylene) tape and then sintering the tapes together.

However, this is a laborious operation that can be done only at low linear rates along the conductor; and the coatings are somewhat rough where the spiral wraps overlap. The present invention obviates these difficulties, and, further, thick coatings may be produced. Unsintered tapes or articles having thicknesses of a mil or less up to one-quarter inch or more may be used in making the encapsulated articles of this invention.

If desired, the tapes used in the present invention may be colored for decorative or identification purposes or they may contain fillers. For example they may contain inorganic materials such as pigments such as titanium dioxide or fiber such as asbestos. Inclusion of mineral fibers leads to desirable high abrasion resistances. Still further, they may include dielectric materials such as silicones and other materials, as disclosed in W. L. Gore U.S. 3,150,207 which lead to products having high corona resistance.

When using poly(tetrafluoroethylene) in the present process, unsintered sheets or tapes are used and the pressure rolls are not heated. The unsintered tapes of poly(tetrafluoroethylene) adhere together tightly when they are compressed in the bight of the rolls, and seals remain strong and homogeneous when the polymeric envelope around the conductors is subsequently sintered by heating to a temperature of between 330° C. and 430° C. For example, a temperature of about 350° C. for about 5 minutes is satisfactory for the sintering step.

The heating time need only be long enough to effect the sintering of the polymer. This will depend upon the size of the oven being used, the amount of coated material being sintered, the type of heat and the speed of the traveling coated articles. While batch sintering can be used, it is preferred to conduct the sintering on a continuous basis. Usually, the time is in the order of only a few seconds but it may be as high as 30 minutes or higher. All that is usually required is sufficient time to get the body heated to the sintering point of the polymer. Further, particularly effective kinds of heating, such as radiant heating may be employed.

The various types of feed or the different ways of forming the nip of resinous materials apply, of course, to a number of fluorocarbon materials. These materials include tetrafluoroethylene copolymers such as tetrafluoroethylene/monochlorotrifluoroethylene polymer, tetrafluoroethylene/hexafluoropropylene, polymonochlorotrifluoroethylene, among others.

By this invention electrical conductors are readily encapsulated with fluorocarbon polymers. High quality sheaths can be produced under controlled conditions. For example, it is possible to produce structures hitherto not feasible, and to manufacture from poly(tetrafluoroethylene) electrical objects that retain the chemical inertness, dielectric and other desirable properties of the resin. Further, the weight of insulation is minimized. This is important, for example, in aircraft and missile wiring in which thin, high quality wiring is most essential. Such objects having no electrical flaws are produced by this invention. These desirable articles are made efficiently and economically.

The present invention offers a particularly unique advantage in that it provides a practical means for eliminating the formation of excess web overlays in the encapsulation of wires and other articles directly from sheets or tapes of plastic materials.

While the invention has been disclosed herein in connection with certain embodiments and certain procedural details, it is clear that changes, modifications or equivalents can be used by those skilled in the art; accordingly, such changes within the principles of this invention are intended to be included within the scope of the claims below.

I claim:

1. A process for encapsulating an electrical conductor in a continuous manner without the production of overlapping spiral wraps or of webs or of material extending outwardly from the material used in the encapsulation, without the use of added adhesive material and at a temperature below the sintering point of the material used in the encapsulation, which process comprises passing along their longitudinal axes one or more tapes of an encapsulating material derived from an unsintered tetrafluoroethylene polymer to and through a tapering spiral element; simultaneously passing the said conductor to be encapsulated through said element so that said conductor lies within a tape, the passage of the resultant assembly through the said element being effective to wrap all of the said polymer circumferentially and uniformly around the said conductor; exerting pressure on the resultant wrapper encapsulating material to enclose the said conductor in the said material and to weld the said unsintered surfaces together when and where they contact each other under said pressure to form a welded and, hence, bonded encapsulation of unsintered polymer all of which lies circumferentially about said conductor; and withdrawing the resultant uniformly encapsulated conductor from the exit side of the said element, the said welding being conducted at temperatures below the sintering point of said polymer and said encapsulation produced being substantially parallel to the longitudinal axis of said conductor and substantially without spirals, webs or added adhesive material.

2. A process in accordance with claim 1 in which said encapsulating material comprises poly(tetrafluoroethylene).

3. A process in accordance with claim 1 in which the said encapsulated conductor is heated after leaving the said element to sinter the said unsintered polymer.

4. A process in accordance with claim 1 in which said element has a tapering section, the inlet end of which is larger than the exit end thereof and in which the tapering section affords a means to wrap the polymer circumferentially around said conductor and in which the smaller exit end affords a means for exerting pressure on the resultant assembly by virtue of the fact that its diameter is less than the sum of the diameter of the conductor to be encapsulated plus the total thickness of the polymer supplying said surfaces.

5. A process in accordance with claim 1 in which said encapsulating material is derived from a single tape of said polymer.

6. In accordance with claim 1, the continuous uniformly insulated conductor produced, the encapsulating material therein being positioned substantially parallel to the longitudinal axis of the conductor and substantially without overlapping spirals, webs or added adhesive material.

7. A continuous assembly free of webs comprising a plurality of electrical conductors uniformly positioned in an encapsulation comprising a sintered tetrafluoroethylene polymer each conductor being bonded to the conductor(s) adjacent to it by a mass of polymer greater than the mass in the encapsulating cross-sections in non-bonding areas.

8. An assembly in accordance with claim 7 in which said polymer is poly(tetrafluoroethylene).

9. A continuous conductor encapsulated with an unsintered tetrafluoroethylene polymer tape which uniformly encompasses said conductor substantially parallel to the long axis of the conductor and substantially without overlapping spirals and without webs, said polymer being pressure welded to itself in an area substantially following in a straight-line manner the said long axis of said conductor.

10. A conductor in accordance with claim 9 in which said polymer is poly(tetrafluoroethylene).

11. A conductor in accordance with claim 10 in which said polymer has been sintered.

12. A process for producing a ribbon cable in which the conductors are coated with unsintered poly(tetrafluoroethylene) and which cable contains no webs which process comprises passing a plurality of conductors separately coated with a polymeric material being unsintered poly(tetrafluoroethylene) side-by-side simultaneously through separate funnel-like pressure elements at a temperature below the sintering point of the said poly(tetrafluoroethylene); exerting pressure in said passing on the said polymeric material to force unsintered polymeric material coating a given conductor into unsintered polymeric material coating a conductor adjacent to said given conductor and to force unsintered polymeric material immediately adjacent each conductor into intimate contact with the conductor it is coating; and withdrawing the resultant assembly from said element in the form of a ribbon cable which has a width less than the summation of the initial diameters of the individually coated conductors and which has the polymeric material still in the form of unsintered poly(tetrafluoroethylene).

13. A process in accordance with claim 12 in which the resultant ribbon cable is heated to sinter the poly(tetrafluoroethylene).

References Cited

UNITED STATES PATENTS

| | | | |
|---|---|---|---|
| 1,672,973 | 6/1928 | Albright | 156—56 |
| 1,945,709 | 2/1934 | Simons | 156—54 |
| 2,204,782 | 6/1940 | Wermine | 156—55 |
| 2,234,523 | 3/1941 | Fischer | 156—54 |
| 2,425,294 | 8/1947 | Morgan | 156—55 |
| 2,666,093 | 1/1954 | Wildberg | 174—117 |
| 2,749,261 | 6/1956 | Hardison | 156—47 |
| 3,082,292 | 3/1963 | Gore | 156—55 X |

JOHN T. GOOLKASIAN, Primary Examiner

M. E. McCAMISH, Assistant Examiner

U.S. Cl. X.R.

117—232; 156—176, 179, 215, 228; 161—60, 123, 189, 216; 174—117, 110.6